(12) United States Patent
Morris et al.

(10) Patent No.: US 10,929,968 B2
(45) Date of Patent: *Feb. 23, 2021

(54) SYSTEMS AND METHODS FOR INSPECTING PIPELINES USING A ROBOTIC IMAGING SYSTEM

(71) Applicant: Mistras Group, Inc., Princeton, NJ (US)

(72) Inventors: Kelly Morris, Anchorage, AK (US); Elliott Morris, Anchorage, AK (US); John Musgrave, Anchorage, AK (US)

(73) Assignee: MISTRAS GROUP, INC., Anchorage, AK (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/021,815

(22) Filed: Sep. 15, 2020

(65) Prior Publication Data

US 2020/0410661 A1 Dec. 31, 2020

Related U.S. Application Data

(63) Continuation of application No. 16/208,459, filed on Dec. 3, 2018, now Pat. No. 10,783,623.

(51) Int. Cl.
*G06K 9/00* (2006.01)
*G06T 7/00* (2017.01)
(Continued)

(52) U.S. Cl.
CPC ............ *G06T 7/0002* (2013.01); *F16L 55/26* (2013.01); *G06T 5/003* (2013.01); *G06T 7/187* (2017.01);
(Continued)

(58) Field of Classification Search
CPC ....... G06T 7/0002; G06T 7/187; G06T 5/003; G06T 11/60; F16L 55/26; F16L 2101/30;
(Continued)

(56) References Cited

U.S. PATENT DOCUMENTS 3,495,626 A 2/1970 Nagel
5,698,854 A 12/1997 Gupta
(Continued)

FOREIGN PATENT DOCUMENTS

CN 106094617 A 11/2016
CN 108693535 A 10/2018
(Continued)

OTHER PUBLICATIONS

Extended European Search Report issued for European Patent Application No. 19212486.5, dated Apr. 17, 2020, 9 pages.
(Continued)

*Primary Examiner* — Mahendra R Patel
(74) *Attorney, Agent, or Firm* — Norton Rose Fulbright US LLP

(57) ABSTRACT

Systems and methods for generating and processing images captured while inspecting above-ground pipelines are disclosed. Embodiments may include a robotic crawler or other devices which carry imaging equipment and traverse a target pipe which are configured to capture image data simultaneously from a plurality of angles. Such systems may substantially reduce and in some cases overcome the need to take multiple traversals of a pipeline under inspection. Embodiments may also be directed toward control systems for such devices as well as image processing systems which process the multiple image sets to produce a composite imaging result.

23 Claims, 17 Drawing Sheets

(51) Int. Cl.
*G06T 7/187* (2017.01)
*F16L 55/26* (2006.01)
*G06T 11/60* (2006.01)
*H04N 5/235* (2006.01)
*G06T 5/00* (2006.01)
*F16L 101/30* (2006.01)

(52) U.S. Cl.
CPC .............. *G06T 11/60* (2013.01); *H04N 5/235* (2013.01); *F16L 2101/30* (2013.01)

(58) Field of Classification Search
CPC ........ H04N 5/235; H04N 5/225; H04N 5/247; G06K 9/00; G06K 9/46; G06K 9/62; H04B 1/16; H04L 29/08
USPC ........................................................ 382/100
See application file for complete search history.

(56) References Cited

U.S. PATENT DOCUMENTS

| | | | | |
|---|---|---|---|---|
| 5,857,534 | A * | 1/1999 | DeVault | B25J 5/007 |
| | | | | 180/21 |
| 5,963,030 | A | 10/1999 | Stark | |
| 8,759,780 | B2 * | 6/2014 | Dobbs | G01N 23/00 |
| | | | | 250/360.1 |
| 9,863,919 | B2 | 1/2018 | Carrasco Zanini et al. | |
| 9,874,507 | B2 | 1/2018 | Dingman et al. | |
| 2004/0211272 | A1 | 10/2004 | Aronstam et al. | |
| 2005/0041775 | A1 * | 2/2005 | Batzinger | G01N 23/18 |
| | | | | 378/59 |
| 2005/0217394 | A1 * | 10/2005 | Langley | G01B 5/066 |
| | | | | 73/865.8 |
| 2007/0000406 | A1 | 1/2007 | Stout | |
| 2009/0120215 | A1 | 5/2009 | Jacobson et al. | |
| 2010/0211354 | A1 | 8/2010 | Park et al. | |
| 2010/0218624 | A1 | 9/2010 | Atwood et al. | |
| 2011/0025608 | A1 * | 2/2011 | Kruglick | G09B 21/003 |
| | | | | 345/173 |
| 2012/0197439 | A1 * | 8/2012 | Wang | B25J 11/009 |
| | | | | 700/259 |
| 2012/0197440 | A1 * | 8/2012 | Farkavec | B08B 9/049 |
| | | | | 700/264 |
| 2012/0256643 | A1 * | 10/2012 | Langley | G01B 7/066 |
| | | | | 324/663 |
| 2013/0014598 | A1 * | 1/2013 | Langley | F16L 55/28 |
| | | | | 73/865.8 |
| 2013/0325768 | A1 * | 12/2013 | Sinyavskiy | G06N 3/049 |
| | | | | 706/16 |
| 2014/0146161 | A1 | 5/2014 | Sibai | |
| 2014/0207406 | A1 | 7/2014 | Domke et al. | |
| 2016/0177540 | A1 * | 6/2016 | Penza | E02F 3/96 |
| | | | | 37/347 |
| 2016/0369934 | A1 * | 12/2016 | Penza | F16J 15/168 |
| 2017/0191601 | A1 * | 7/2017 | Sever | G01N 29/225 |
| 2017/0205230 | A1 | 7/2017 | Send et al. | |
| 2018/0178811 | A1 * | 6/2018 | Ohta | B60R 1/00 |
| 2018/0180733 | A1 * | 6/2018 | Smits | G01S 7/4863 |
| 2018/0313715 | A1 * | 11/2018 | Cichosz | G06K 9/00664 |
| 2019/0086020 | A1 | 3/2019 | Wehlin et al. | |
| 2020/0011995 | A1 | 1/2020 | Send et al. | |

FOREIGN PATENT DOCUMENTS

| | | | | |
|---|---|---|---|---|
| CN | 207983366 U | * | 10/2018 | |
| EP | 2718741 A1 | * | 4/2014 | ........ B23K 37/0282 |
| JP | 3296648 B2 | | 7/2002 | |
| KR | 101290794 B1 | * | 7/2013 | |
| WO | WO-2015/063483 A1 | | 5/2015 | |
| WO | WO-2015063483 A1 | * | 5/2015 | .......... G01N 23/083 |
| WO | WO-2015/172231 A1 | | 11/2015 | |
| WO | WO-2016/049645 A1 | | 3/2016 | |
| WO | WO-2016049645 A1 | * | 3/2016 | ............. G01B 17/02 |

OTHER PUBLICATIONS

Tavakoli et al., "3DCLIMBER: Climbing and Manipulation Over 3DStructures," Mechatronic, vol. 21, No. 1, 2011, 15 pages.
Yukawa et al. "Magnetic Part Design of Pipe-Surface Inspection Robot," IEEE 32nd Annual Conference on Industrial Electronics, Nov. 2006, 6 pages.
Extended European Search Report issued for European Patent Application No. 19212415.4, dated May 4, 2020, 10 pages.

* cited by examiner

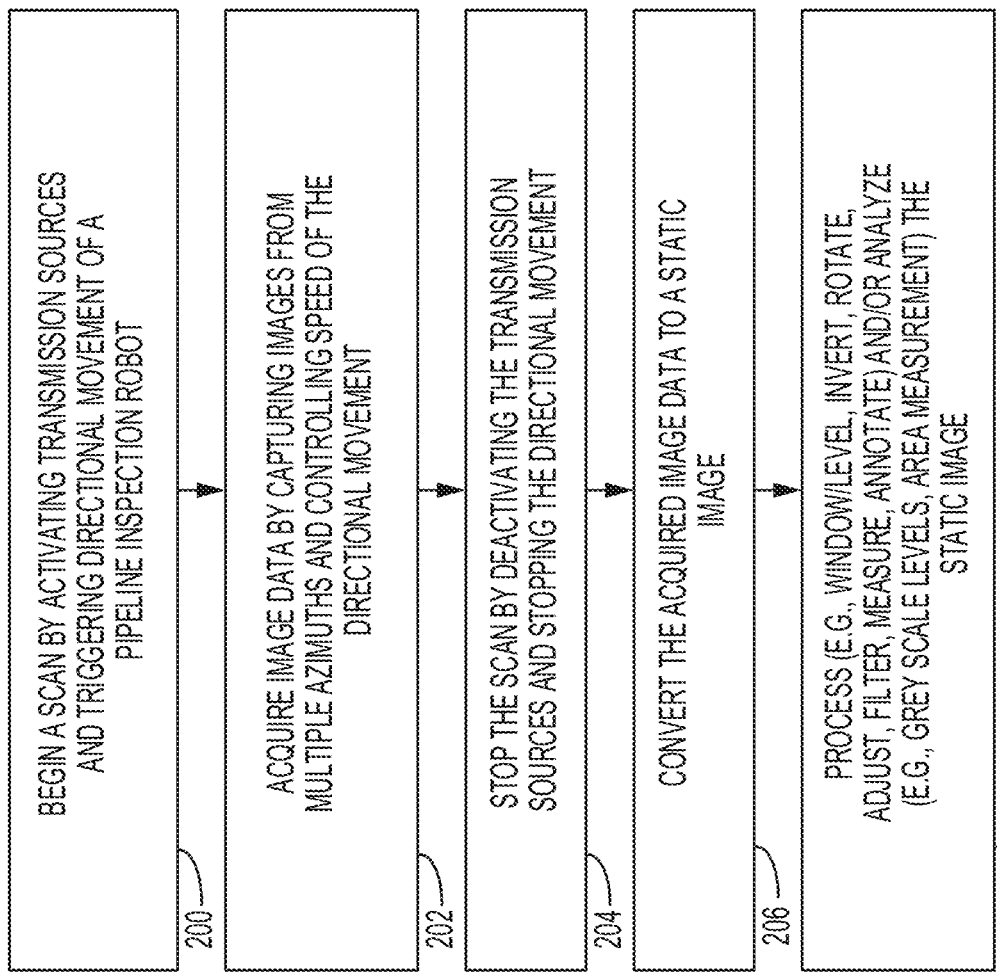

SYSTEMS AND METHODS FOR INSPECTING PIPELINES USING A ROBOTIC IMAGING SYSTEM

CROSS-REFERENCE TO RELATED APPLICATIONS

The present application is a continuation of U.S. patent application Ser. No. 16/208,459 filed Dec. 3, 2018 and entitled "SYSTEMS AND METHODS FOR INSPECTING PIPELINES USING A ROBOTIC IMAGING SYSTEM." The present application is also related to co-pending, commonly assigned U.S. patent application Ser. No. 16/544,790 filed Aug. 19, 2019 and entitled "SYSTEMS AND METHODS FO INSPECTING PIPELINES USING A ROBOTIC IMAGING SYSTEM." The disclosures of both applications are incorporated by reference herein in their entirety.

TECHNICAL FIELD

Aspects of the present disclosure relate generally to inspection of above ground pipelines, and more particularly, to systems and methods for obtaining and processing images to inspect a pipeline using a pipeline inspection robot.

BACKGROUND

Above ground pipelines develop internal corrosion as well as corrosion underneath insulation ("CUI") on the exterior of the pipe. CUI typically occurs due to a moisture buildup on the external surface of insulated equipment. The corrosion itself is most commonly galvanic, chloride, acidic, or alkaline corrosion. If undetected, the results of CUI can lead to leaks, the eventual shutdown of a pipeline, and in rare cases it may lead to a safety incident. Accordingly, it is important to periodically inspect above ground pipelines for the presence of corrosion.

Current methods of inspecting above ground pipelines have typically entailed the erection of scaffolding, hazardous usage of radiation sources, and/or use of imaging equipment mounted on poles and positioned by hand to inspect and image the pipeline. Moreover, existing inspection methods generally require multiple series of images to be acquired to capture multiple angles of view by performing multiple traversals of the pipeline. These manual methods are labor intensive, time consuming, and costly to entities inspecting their pipelines.

Previous attempts to improve the inspection process have involved a semi-automated collar system with a vehicle mounted to a top of the pipeline. Resulting imagery from such a system has taken the form of a video or series of film-type images for a single view of the pipeline. Such imagery is also time and labor intensive to review as it requires a user to examine the entire video and/or long series of images. Additionally, multiple views of the pipeline are still needed in order to properly inspect the pipeline. Similar to manual techniques, these collar systems also require multiple traversals of the pipeline to obtain these views, which also result in multiple sets of data to be reviewed. These systems also suffer from further practical issues which hinder usage. For example, radiation sources and imaging techniques employed with the collar system require a large exclusion zone to be utilized where technicians must not enter while collecting images due to hazardous radiation sources employed in the imaging techniques. The imaging systems are also heavy, which hinders the operability of the respective vehicle.

SUMMARY

The following summarizes some aspects of the present disclosure to provide a basic understanding of the discussed technology. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

The present application discloses systems and methods for generating and processing images captured while inspecting above-ground pipelines. Embodiments may include a robotic crawler or other devices which carry imaging equipment and traverse a target pipe which are configured to capture image data simultaneously from a plurality of angles. Such systems may substantially reduce and in some cases overcome the need to take multiple traversals of a pipeline under inspection. Embodiments may also be directed toward control systems for such devices as well as image processing systems which process the multiple image sets to produce a composite imaging result.

Embodiments of the present application may include an robotic apparatus for pipeline imaging and inspection. The apparatus may include one or more computer processors and at least one memory coupled to the one or more computer processors. When fully configured, the one or more computer processors is configured to: activate one or more transmission sources and directionally move a pipeline inspection robot; simultaneously capture images from two or more azimuths; and deactivate the one or more transmission sources and stop the directional movement of the robot.

In yet another embodiment, a method of operation for a pipeline inspection robot is provided. The method may include one or more of: beginning a scan by activating one or more transmission sources and triggering directional movement of the robot; acquiring image data by simultaneously capturing images from two or more azimuths and controlling speed of the directional movement; and stopping the scan by deactivating the one or more transmission sources and stopping the directional movement of the robot.

Another embodiment may be characterized as a computer-readable storage medium having instructions recorded thereon that, when executed by one or more computer processor, cause the one or more computer processors to: begin a scan by activating one or more transmission sources and triggering directional movement of a pipeline inspection robot; acquire image data by simultaneously capturing images from two or more azimuths and controlling speed of the directional movement; and stop the scan by deactivating the one or more transmission sources and stopping the directional movement of the robot.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

FIG. 2 is a block diagram illustrating example blocks of a method of operation for a pipeline inspection robot according to some embodiments of the present disclosure.

DETAILED DESCRIPTION

The detailed description set forth below, in connection with the appended drawings, is intended as a description of various possible configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to inspection of above ground pipelines. A pipeline inspection robot is disclosed that employs one or more transmission sources (e.g., X-ray tubes) with one or more detectors (e.g., linear detectors) to capture images of a pipeline. Improvements and advantages exhibited by the pipeline inspection robot include a less dangerous radiation source in the form of one or more X-ray tubes. For example, some embodiments may use a pair of 12 Watt X-ray tubes, but other embodiments may employ a different number or wattage X-tubes (e.g., a single 900 W X-ray tube). The exclusion zone may thus be reduced to less than two feet from the pipeline inspection robot. Additional improvements and advantages result by employing X-ray tubes and linear detectors to capture images of the pipeline from multiple views (e.g., azimuths) in a single traversal. The resulting imagery may further be converted to a static image for processing and analysis.

Figure 1:
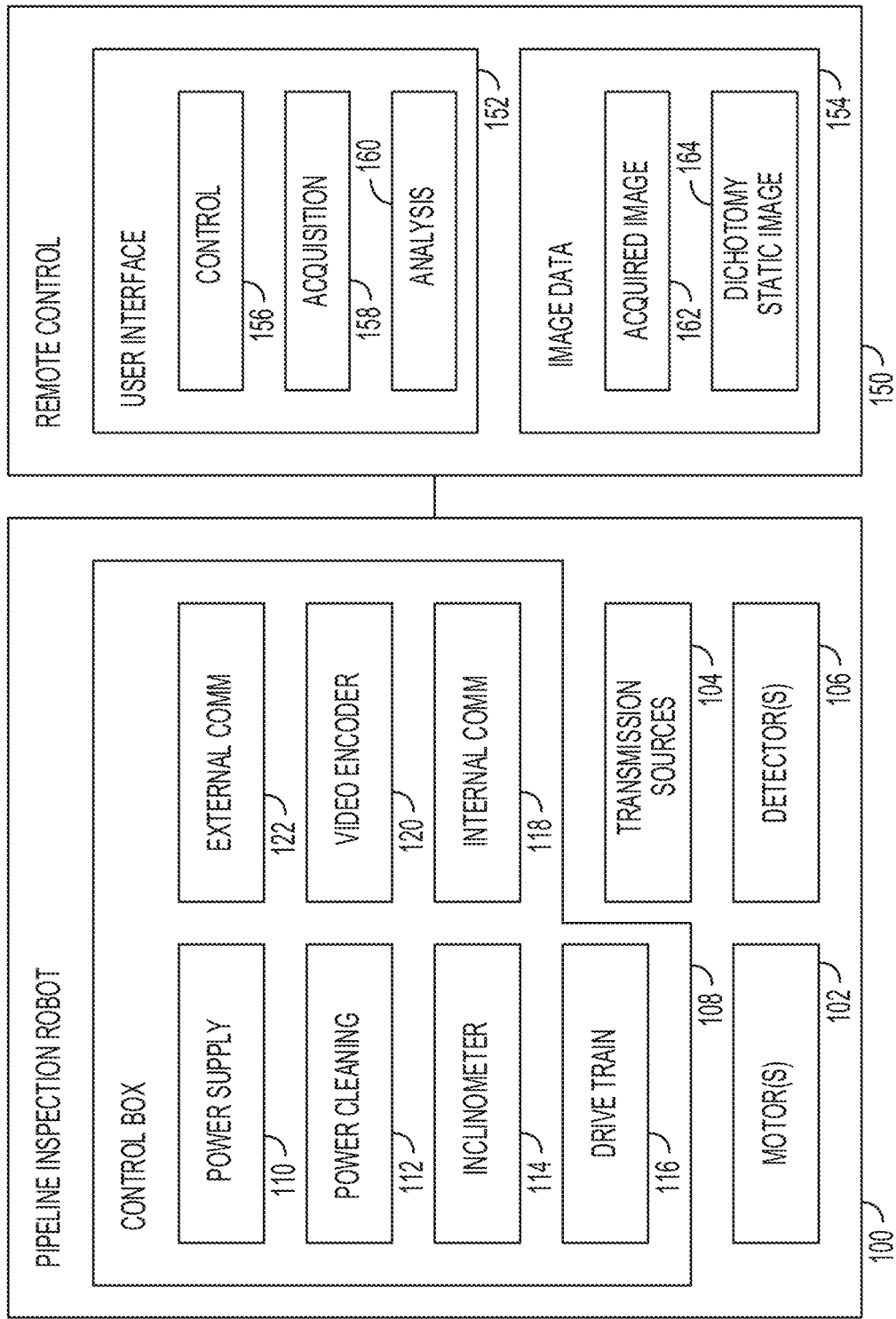
FIG. 1 is a block diagram illustrating details of a pipeline inspection robot and remote control equipment according to some embodiments of the present disclosure.

Referring to FIG. 1, a pipeline inspection robot 100 and remote control equipment 150 have various components. For example, the pipeline inspection robot 100 may have one or more motors 102, such as motors connected to drive tracks that move the robot to traverse the pipeline. Alternatively or additionally, the motors may drive other types of traversal mechanisms, such as wheels, hands, feet, claws, teeth, propeller, wing, winch, fin or any other type of mechanism that can be used to motivate traversal of a horizontal or non-horizontal pipeline. Motors 102 may also include one or more of encoders or resolvers to provide feedback to control equipment. Additionally, the pipeline inspection robot may have one or more imaging transmission sources 104 (e.g., X-ray tubes) and one or more detectors 106, such as linear detectors (collectively referred to as imaging components). Further, the pipeline inspection robot may have a control box 108.

Control box 108 of pipeline inspection robot 100 may have various components, such as power supply circuitry 110 and power cleaning circuitry 112 to supply power to other components. Power supply circuitry may be connected to an external power or a generator source. Inclinometer 114 may be included to sense and correct the relative placement of the robot on the pipeline in such a way that it stays on top of the pipeline and levels, orients, and/or centers the robot automatically throughout traversal of the pipeline. Motor controller 116 may operate the motors 102 according to input from the inclinometer and other input from an operator that determines a speed and direction of travel for the robot to both drive the robot and to make orientation corrections to the robot. It is appreciated that the orientation and level of the robot may be desired to be maintained in as much of a constant position as possible, such maintenance is better for uniform imaging and for the safety of the robot itself. Internal communication circuitry 118 may relay signals between the components of the control box 108. A video encoder 120 may be provided with one or more cameras that may be disposed to capture images in an inspection area in a vicinity of the robot. The video encoder 120 may perform some preprocessing of the captured images to encode one or more video streams. Images captured at detectors 106 may be processed and/or encoded by separate processing circuitry within robot 100 or such data may also be processed within video encoder 120. It is appreciated that the video encoder is generally utilized when the image capture devices are in video format and the use of digital still cameras would generally obviate the need for encoder 120. Alternatively, imaging data captured at detectors 106 may be remotely processed as discussed in more detail below wither with control box 108 or at a remote station. External communication circuitry 122 may provide wired or wireless communication with remote control equipment 150.

Components of remote control equipment 150 may include a user interface 152 and image data storage 154. In turn, user interface 152 may have a control interface 156 for controlling movement of the robot, and an image acquisition interface 158 that controls acquisition of image data 162 acquired by the robot, display of the image data 162 in a scrolling fashion, and conversion of the acquired image data into a static image, such as a Digital Imaging and Communication in Non-Destructive Evaluation (DICONDE) static image 164. Additionally, user interface 152 may include components 160 for processing and/or analyzing the static image. The illustrated interfaces comprise custom designed robot control software and image acquisition and display software. The robot control software using feedback from the motor encoders or resolvers, axle encoders and inclinometer controls speed and position of the robot on the pipeline and precisely matches the speed of the robot with the acquisition speed of a linear detector. It may also precisely index distance if a field array is used.

Additional details regarding the robot 100 and remote control equipment 150 are provided below with respect to certain embodiments described with reference to FIGS. 3-18. It is also appreciated that while various aspects are illustrated as separate functional blocks, each of these aspects may utilize either separate or combined computing resources such as processors, memories, etc. Still further details regarding mechanical and electro mechanical aspects of the robot 100 may be found in U.S. Pat. App. No. 16/208,466, entitled "SYSTEMS AND METHODS FOR INSPECTING PIPELINES USING A PIPELINE INSPECTION ROBOT," filed Dec. 3, 2018 by the Applicant. The disclosure of this application is incorporated by reference herein in its entirety for any and all purposes.

Turning now to FIG. 2, a method of operation for a pipeline inspection robot begins at block 200. At block 200, the method includes beginning a scan by activating one or more transmission sources (e.g., X-ray tubes) and triggering directional movement of the robot. The activation of the X-ray tubes and triggering of directional movement may occur in response to one or more user interface inputs as described above.

At block 202, the method includes acquiring image data by capturing images from two or more azimuths. In some embodiments, a user may receive real-time image capture results which are transmitted between control box 150 and remote control 154. Further, a user may control the speed of the directional movement of the robot during a capture phase. The speed may be controlled automatically, or based on user interface inputs under control of a skilled operator contemporaneously viewing the displayed image capture results. For example, a user may determine how many milliseconds per line the detector captures, and then the software controls the speed of the robot accordingly. The image capture results may be displayed in a scrolling fashion to permit the operator to observe the contrast of the acquired image data. Accordingly, the operator is enabled to adjust the speed based on the observed contrast to obtain a desired level of contrast in the image data.

At block 204, the method includes stopping the scan by deactivating the one or more transmission sources and stopping the directional movement of the robot. The deactivation of the one or more transmission sources and stopping of the directional movement of the robot may occur in response to one or more user interface inputs as described above.

At block 206, with the image data acquired, the method may further include converting the acquired image data to a static image. The converting of the acquired image data to a static image may occur in response to one or more user interface inputs as described above. In some embodiments, a single user interface input may trigger the deactivating of the transmission sources, the stopping of the robot, and the conversion of the image data to a static image. It is also envisioned that the static image may be a DICONDE static image. After block 206, processing may end. Alternatively, processing may return to an earlier point in the process, such as block 200, to begin inspection of another pipeline section. Moreover, processing may pause while transitioning between segments of a pipeline (e.g., when crossing over a pipeline support structure).

At block 208, the method may include processing and/or analyzing the static image. For example, processing the static image may include adjusting brightness and/or contrast of the static image, inverting, rotating, and/or filtering the static image, choosing measurement units for the static image, and/or annotating the static image. Additionally or alternatively, analyzing the static image may include measuring grey scale levels across a line profile of the static image and/or measuring an area of the static image. The processing and/or analyzing of the static image may occur in response to one or more user interface inputs as described above. After block 206, processing may end. Alternatively, processing may return to an earlier point in the process, such as block 200, to begin inspection of another pipeline section.

Figure 3A:
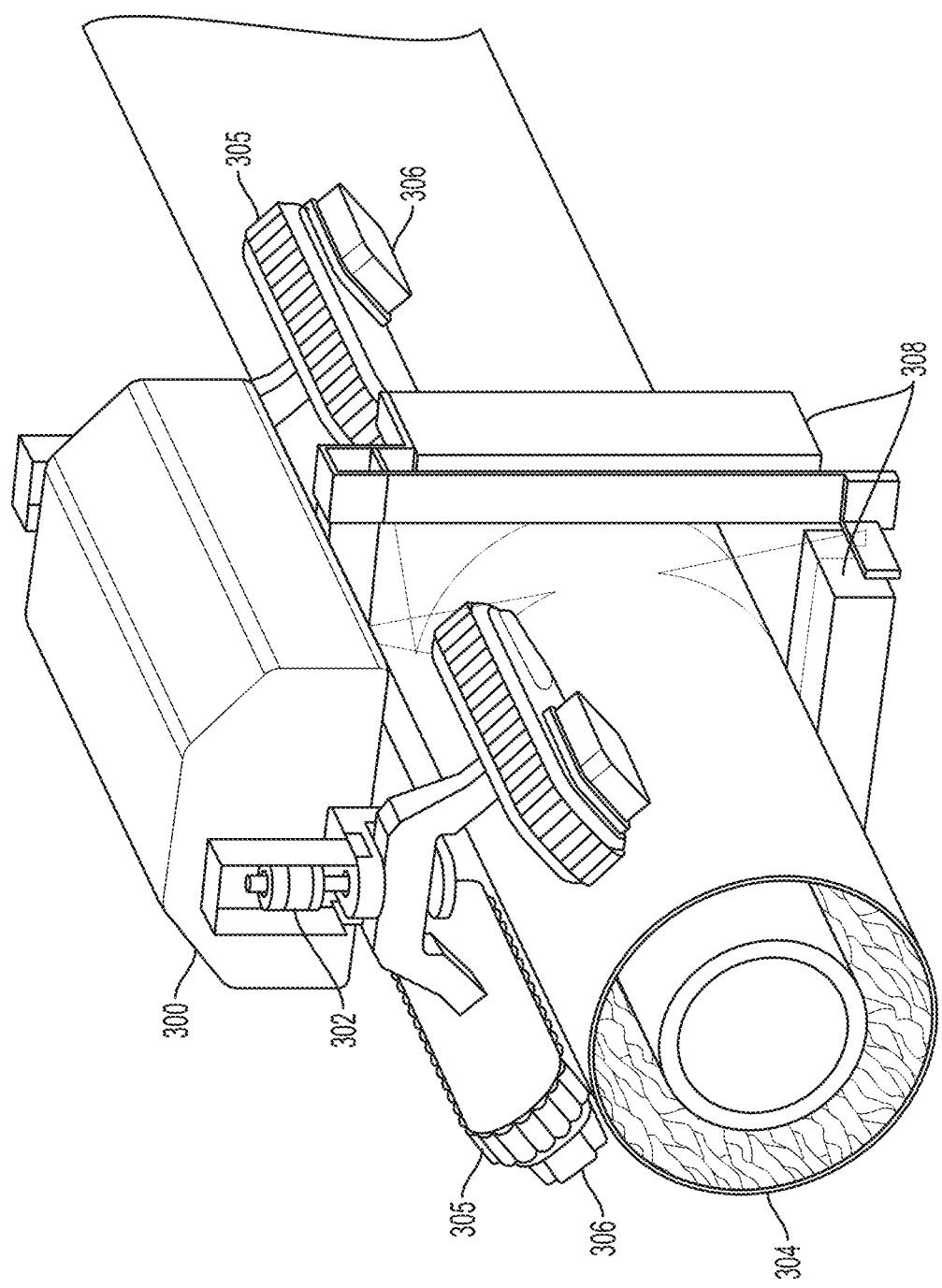
FIG. 3A is a perspective view of a pipeline inspection robot according to some embodiments of the present disclosure.
Figure 3B:
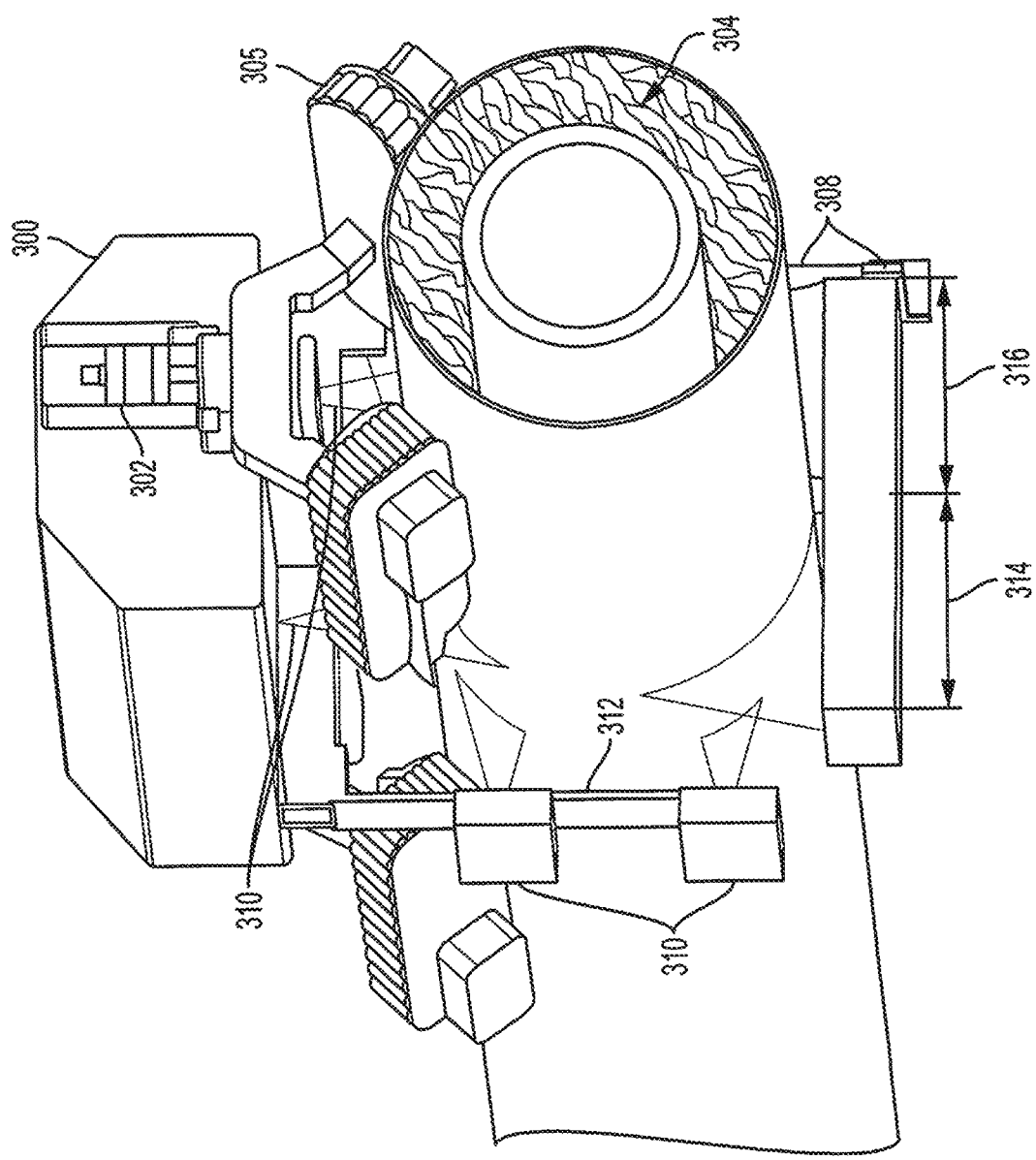
FIG. 3B is another perspective view of a pipeline inspection robot according to some embodiments of the present disclosure.

Turning now to FIG. 3A and FIG. 3B and referring generally thereto, an embodiment of a pipeline inspection robot may be configured with tracks 305 for traversing pipeline 304. In the illustrated embodiment, each of the tracks 305 may have an independent motor 306 to control speed and direction of the individual track 305. A pair of axle position encoders 302 may provide an axle angle data to a controller inside control box/housing compartment 300, which individually controls motors 306 and may function to automatically level and/or center the robot on top of the pipeline 304.

In addition to motion control hardware and power supplies and other aspects described with respect to FIG. 1, control box 300 may house one or more X-ray tubes, such as a pair of 60 kV 12 W X-ray tubes. These tubes serve as radiation sources 310, as do additional radiation sources 310 provided on a downwardly extended member 312. Together, these radiation sources 310 produce X-ray beams 308 along more than one azimuth. For example, the sources 310 are arranged so that the beams 308 are directed along tangents to a circle that resides inside the insulation and/or wall of the pipeline 304. A pair of linear detectors 308 are arranged on perpendicular members that extend down beside and underneath the pipeline 304 to receive the radiation from the beams, and each sensor array of each detector is divided into two sensor array sections 314 and 316 that produce separate imaging streams so that four images are captured contemporaneously. In the illustrated embodiment, the linear detector was selected which has an 800 micron pixel pitch in order to obtain sufficient resolution and sensitivity for the current embodiment, however other types of detectors may be utilized which provide performance suitable for the needs of the particular project. Each image stream provides a side view of a quadrant of the insulated pipeline 304. Although four beams, four azimuths, and four array sections are shown, it should be understood that other embodiments may have more or less (e.g., 2) azimuths, beams, and array sections depending on particular inspection needs.

It is noted that embodiments may have one or more of the perpendicular members on which the linear detectors are arranged may quickly detach from and reattach to the robot to permit traversal of a support member of the pipeline 304 as discussed above. For example, the member that supports the linear detector arranged beneath the pipeline may be reattachably detachable so that a pipeline support member may be cleared during traversal of the robot or so that the robot may be removed from the pipeline 304. Alternatively or additionally, the member that extends down beside the pipeline may detachably detach form the robot, which accomplishes removal of both detectors. In alternative embodiments, detectors 308 and sources 310 may be configured such that the robot may traverse support members without stopping the inspection scanning.

Figure 4:
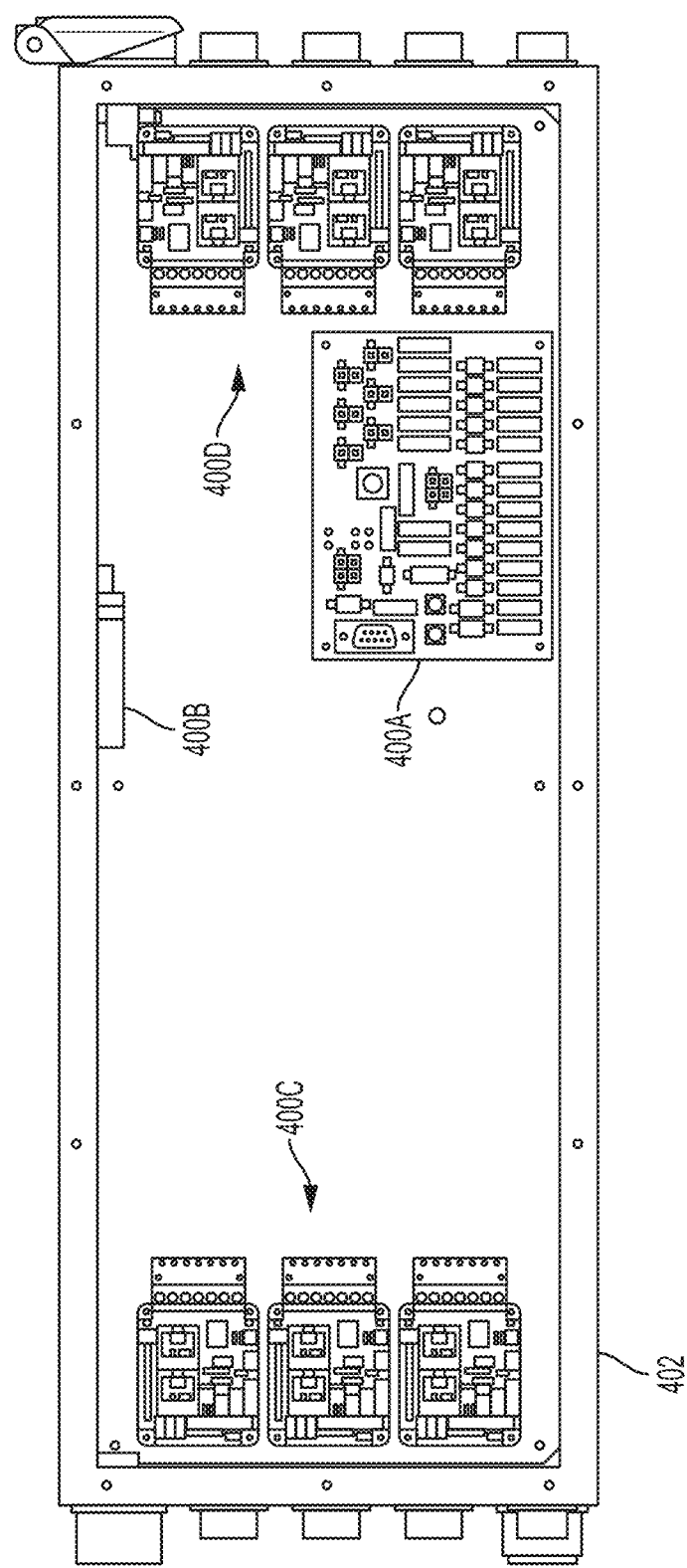
FIG. 4 is a schematic of internal component of a data interface unit of a pipeline inspection robot according to some embodiments of the present disclosure.
Figure 6:
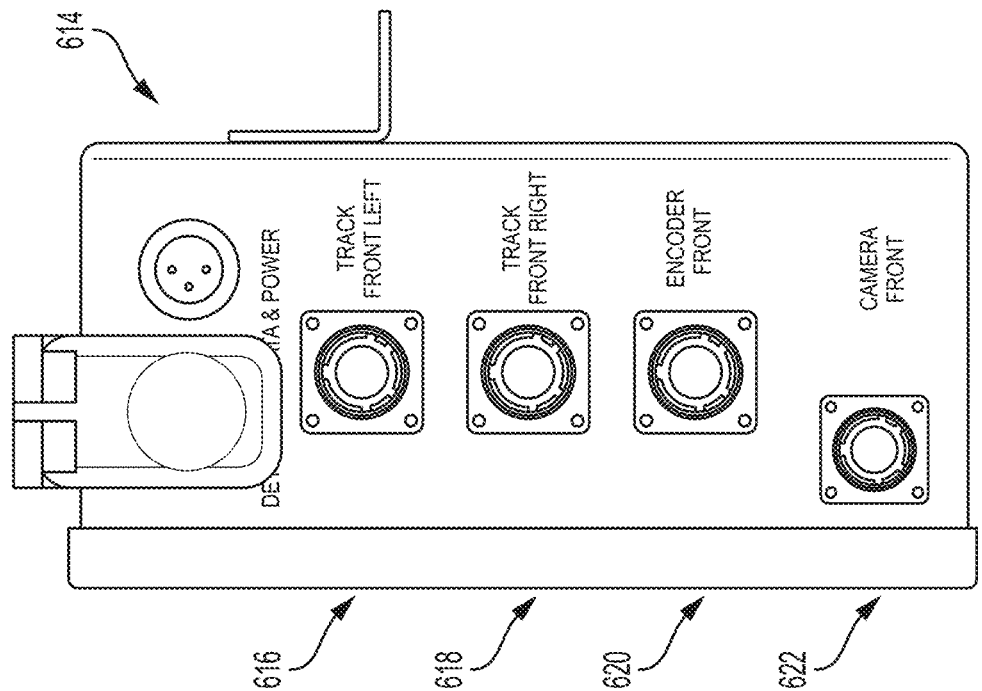
FIG. 6 is a schematic of additional external components of a data interface unit of a pipeline inspection robot according to some embodiments of the present disclosure.
Figure 5:
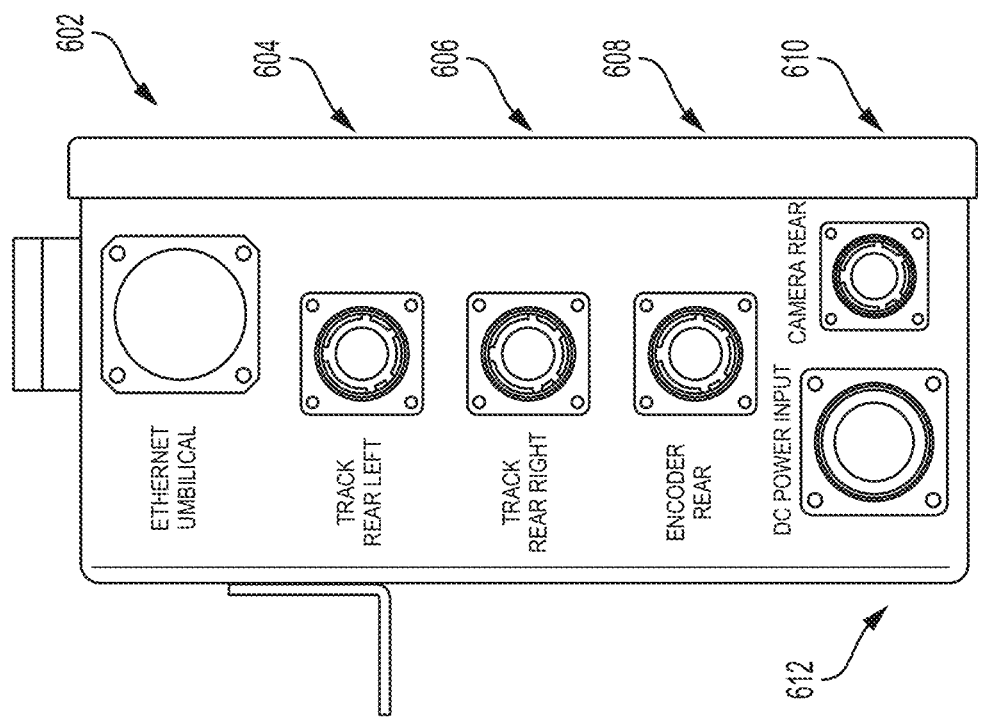
FIG. 5 is a schematic of external components of a data interface unit of a pipeline inspection robot according to some embodiments of the present disclosure.
Figure 7:
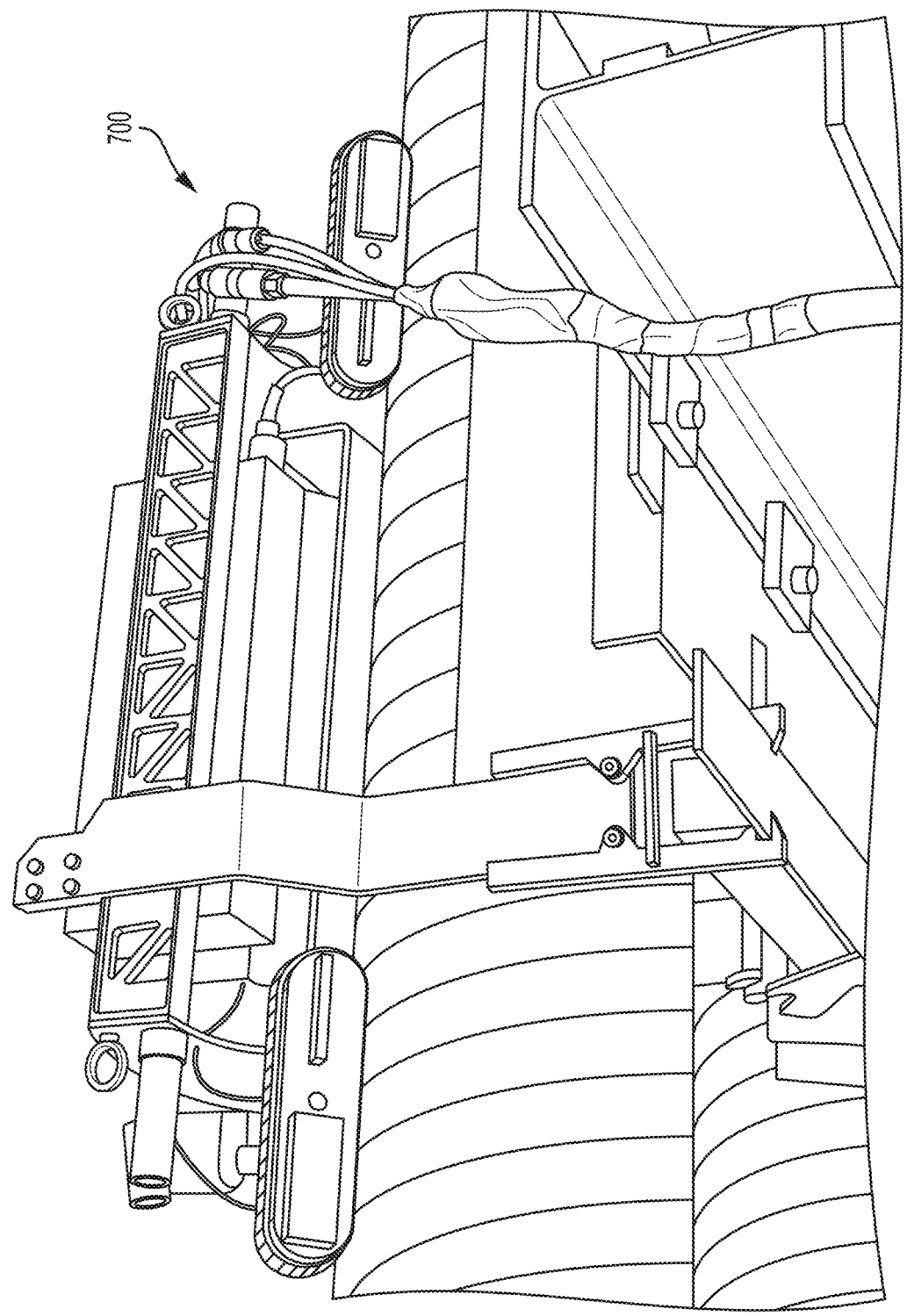
FIG. 7 is a perspective view of a cable connection between remote control equipment and a pipeline inspection robot according to some embodiments of the present disclosure.
Figure 8:
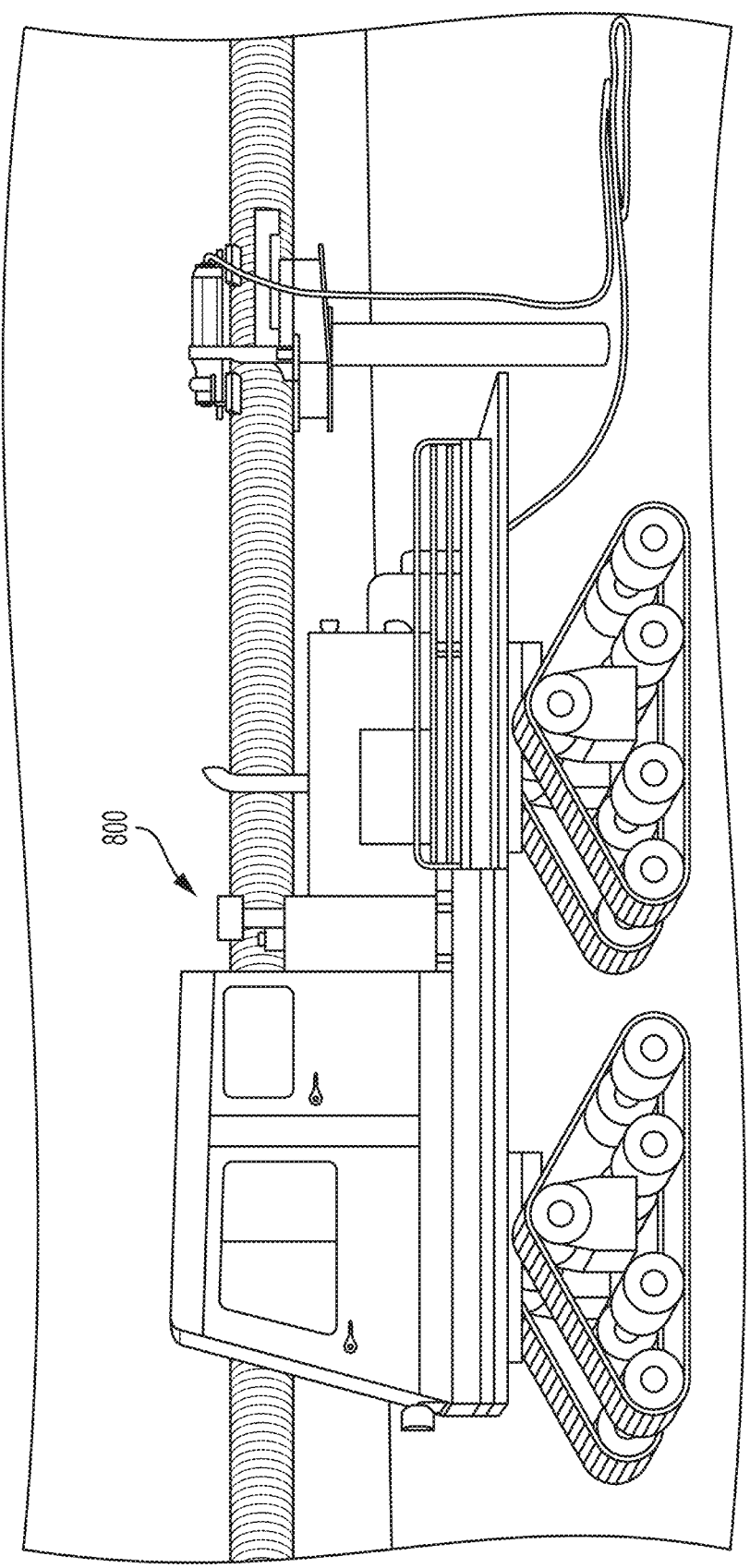
FIG. 8 is a perspective view of an arrangement of remote control equipment connected to a pipeline inspection robot according to some embodiments of the present disclosure.

FIG. 4 provides a schematic of some of the internal components, specifically PCB interconnect board 400A, inclinometer 400B, and motor controllers 400C-400D, of data interface unit 402, which may correspond to a part of control box 100 (see FIG. 1). It is appreciated that the illustrated components may be separated or combined with the functionality of other control/processing components. For example, a single processing unit may be provided which handles all of the control processing and interconnection of the component parts of the robot. The arrangement of these components corresponds to the arrangement of external components shown in FIGS. 5 and 6. For example, one rear end of the data interface unit has ports for an Ethernet umbilical 602, a track rear left control cable 604, a track rear right control cable 606, an encoder rear signal line 608, a camera rear signal line 610, and a DC power input 612. Additionally, an front end of the data interface unit has ports for a detector data and power connection 614, track front left control cable 616, a track front right control cable 618, an encoder front signal line 620, and a camera front signal line 622. A cable bundle 700 (see FIG. 7) provides signal exchange between the robot and a vehicle 800 (see FIG. 8) housing remote control equipment, such as a robot movement control screen and an image acquisition screen. It is envisioned that other embodiments may have wireless communication between the data interface unit and the remote control equipment. Further, one or more power sources may be located onboard the robot to further facilitate wireless use.

Figure 9:
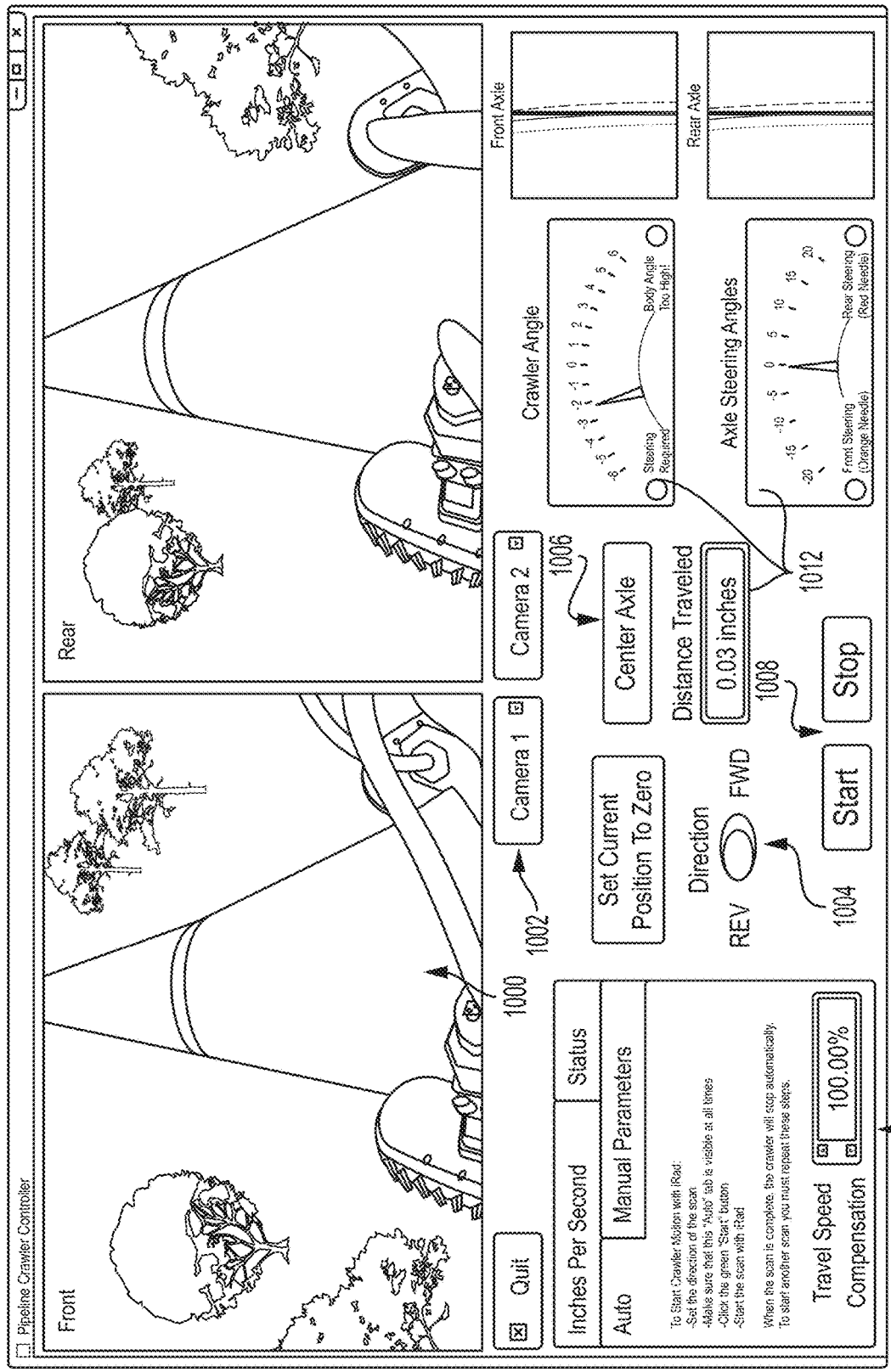
FIG. 9 is a screenshot illustrating user interface components for controlling movement of a pipeline inspection robot according to some embodiments of the present disclosure.

Turning to FIG. 9, user interface components for controlling movement of a pipeline inspection robot may have one or more display regions 1000 to display video streams of the inspection area and controls 1002 for turning the streams and/or corresponding cameras on and off. These display areas/cameras may be oriented in a plurality of directions. In the illustrated embodiment a front and rear view are shown. It is appreciated that other views and cameras may be available, e.g. looking directionally left, right, and downward at different points on the robot. Another control 1004 governs forward or reverse direction of travel of the robot, while control 1006 permits the operator to recenter an axle of the robot. Controls 108 permit the operator to start and stop the movement of the robot, while additional controls 1010 allow the operator to control speed of the robot, check status of the robot, configure manual inputs, and/or configure an automated mode that allows the operator to control the robot from a mobile device. Display regions 1012 provide data to the operator, such as distance travelled, crawler angle, and axle steering angles. It is appreciated that any additional controls to implement the functionality described herein may also be provided. For example, the cameras described above may be useful to an operator to help move the robot and maintain the spatial orientation of the robot in order to capture effective imaging data. In some embodiments such assistance to a user may be provided with other types of sensor data (e.g. electromagnetic imaging such as IR, Radar, and the like, ultrasound, etc.). These sensor-based assistance measures may utilize processing circuitry discussed above and provide feedback signals to steer the robot automatically. Additionally, and alternatively, the feedback may be provided to a user interface in a manner that allows a user to monitor conditions and data from said sensors. It is further appreciated that each of these methods may be utilized individually or in combination to facilitate the functionality of the robot.

Figure 10:
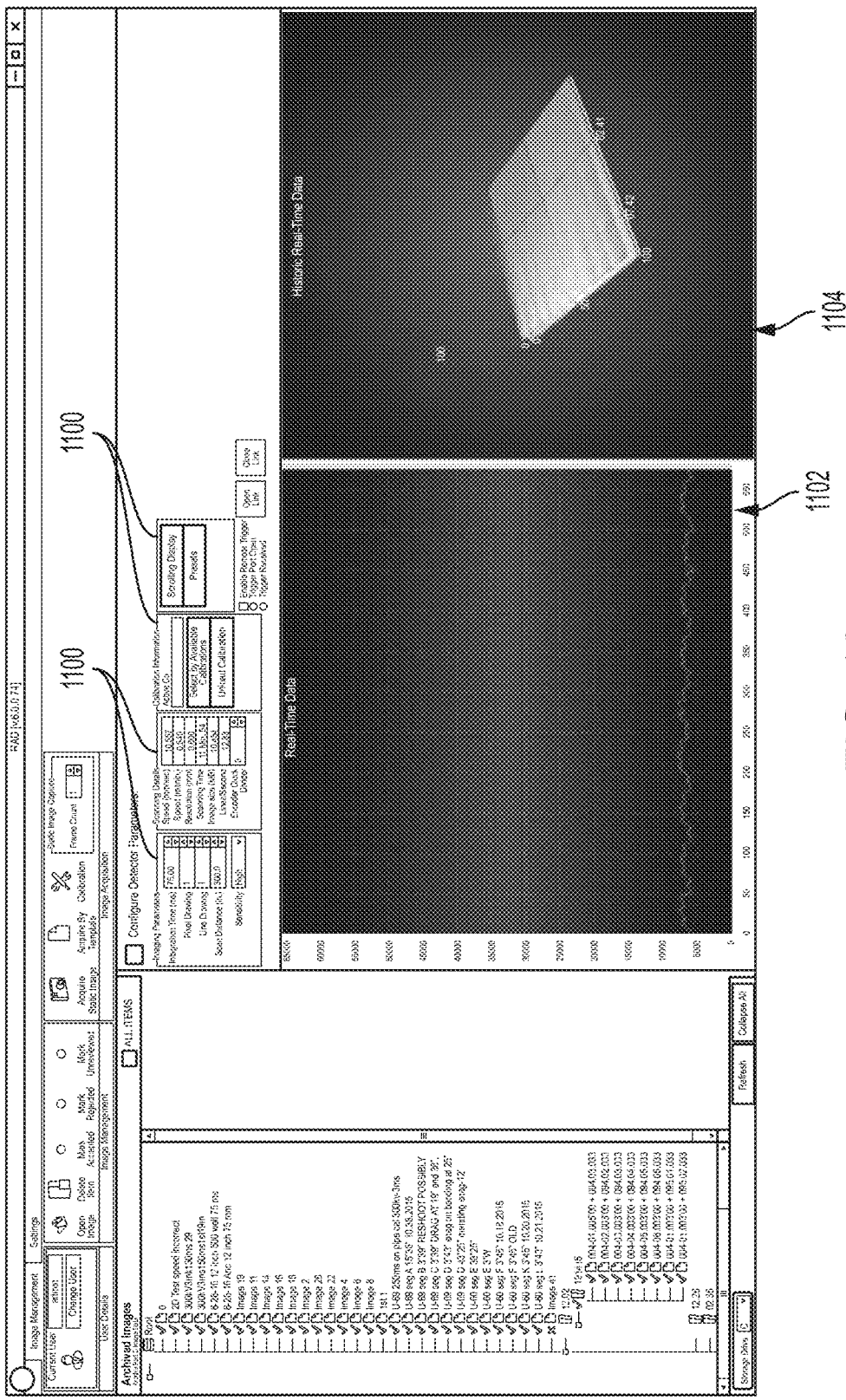
FIG. 10 is a screenshot illustrating user interface components for controlling acquisition of image data by a pipeline inspection robot according to some embodiments of the present disclosure.
Figure 11:
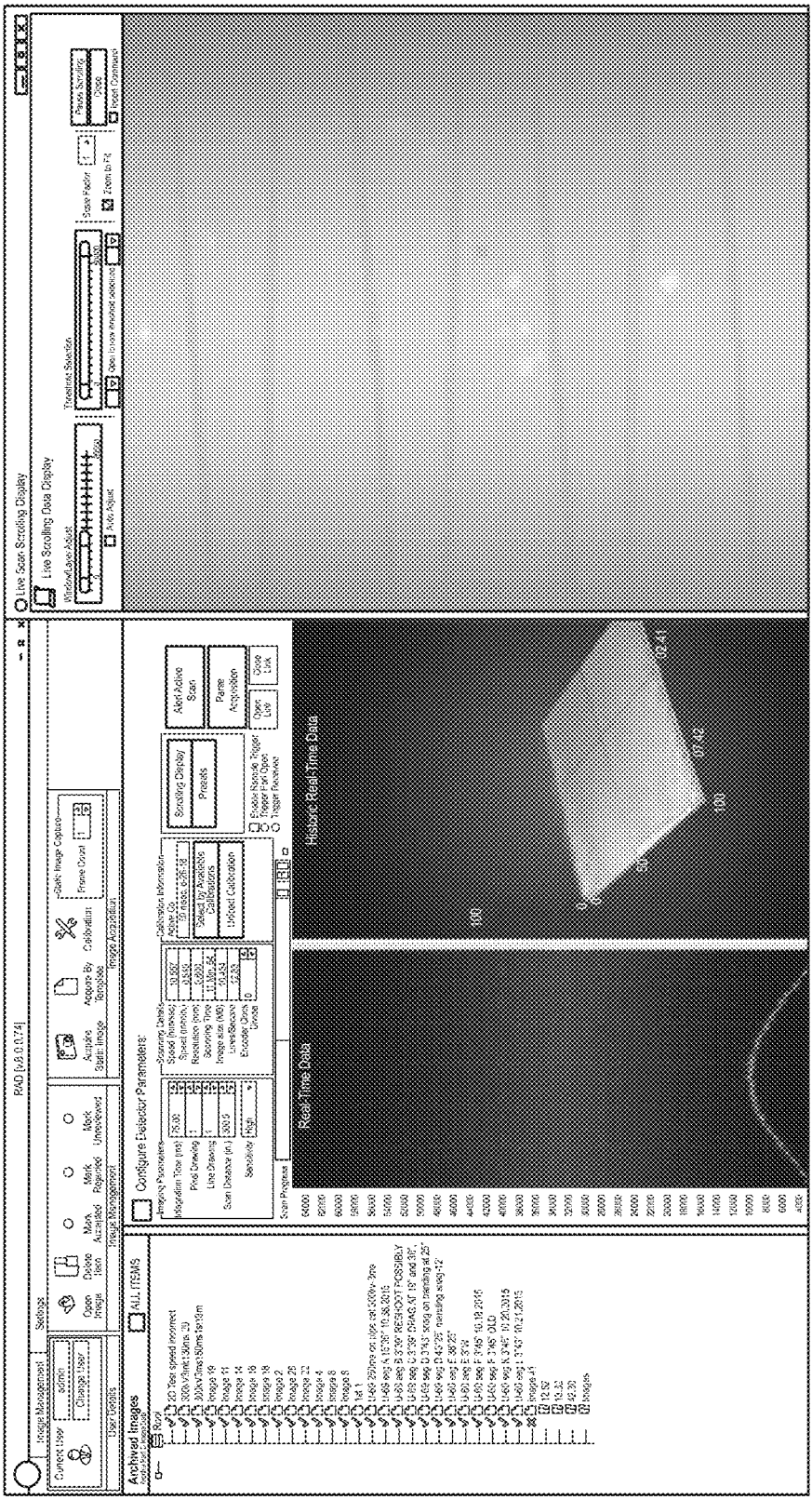
FIG. 11 is a screenshot illustrating display of a static image formed of image data acquired by a pipeline inspection robot according to some embodiments of the present disclosure.

Turning now to FIG. 10, user interface components for controlling image data acquisition by the robot include inputs for imaging parameters, scanning details, calibration information, and scrolling display configuration. Display regions 1102 and 1104 provide a live energy line and a waterfall plot. In scrolling mode, the image is displayed as it is acquired. Once the acquisition is complete, the image is displayed in the image viewer window 1200 (see FIG. 11).

Figure 12:
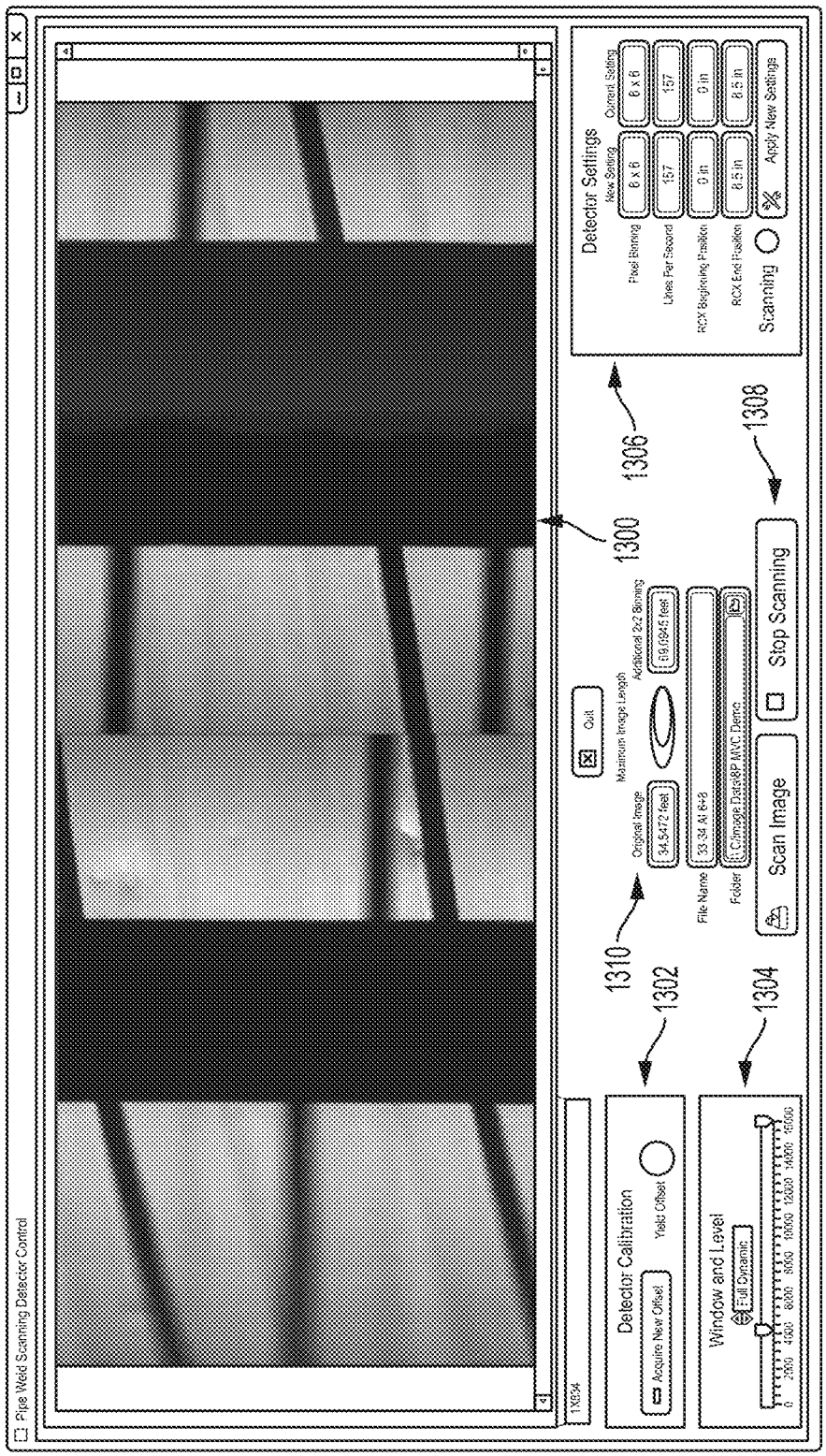
FIG. 12 is a screenshot illustrating user interface components for performing automated scan by a pipeline inspection robot according to some embodiments of the present disclosure.
Figure 13:
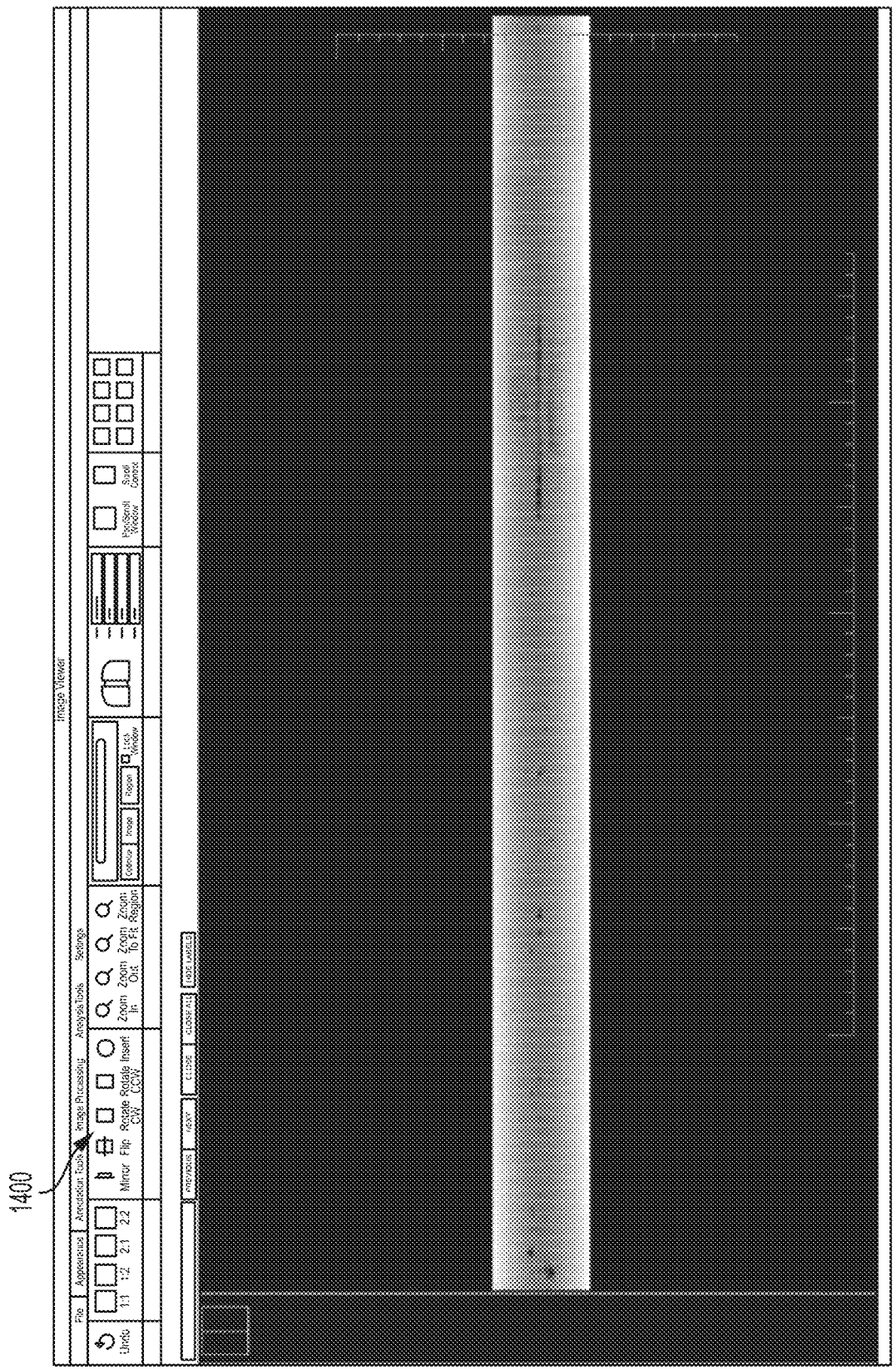
FIG. 13 is a screenshot illustrating user interface controls for processing of a static image formed of image data acquired by a pipeline inspection robot according to some embodiments of the present disclosure.
Figure 14:
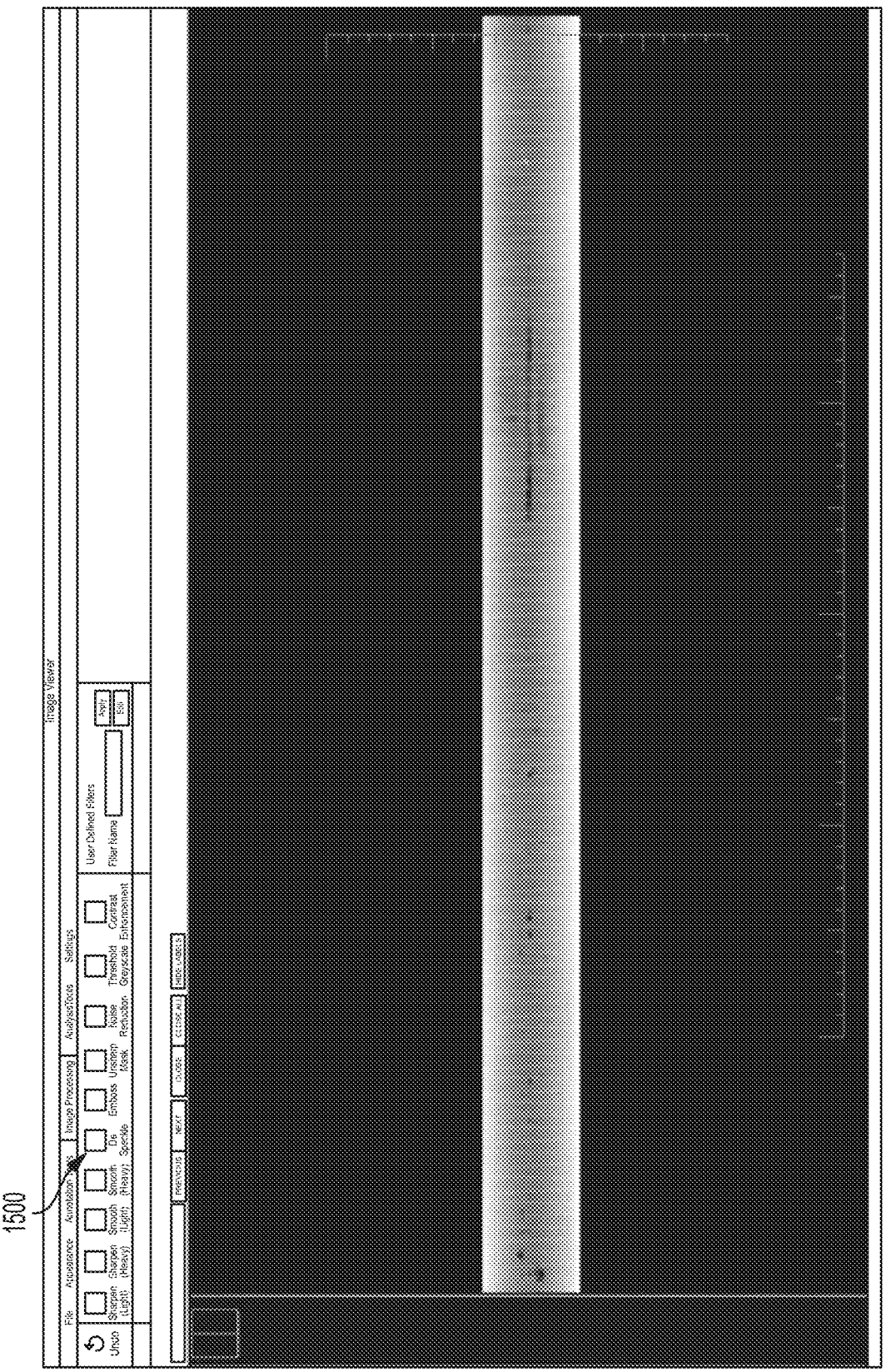
FIG. 14 is a screenshot illustrating user interface controls for additional processing of a static image formed of image data acquired by a pipeline inspection robot according to some embodiments of the present disclosure.
Figure 15:
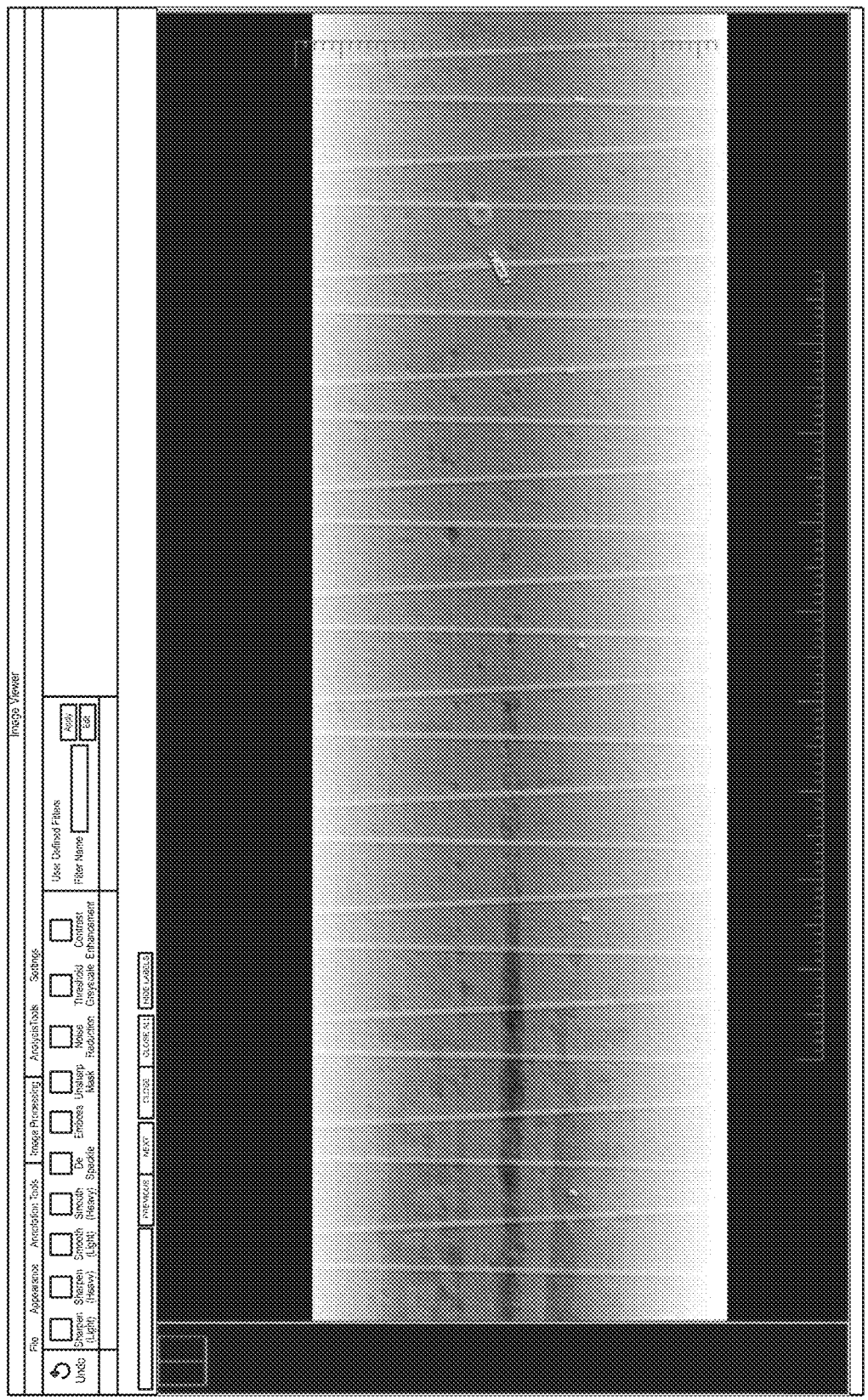
FIG. 15 is a screenshot illustrating application of a filter to a static image formed of image data acquired by a pipeline inspection robot according to some embodiments of the present disclosure.

Turning now to FIG. 12, an alternative or additional user interface may be provided to assist in the control of the image capture devices. A scrolling display region 1300 provides a scrolling display of the image data as it is acquired. Detector calibration control 1302 may be used to calibrate the detectors, and a window/level control 1304 may be used to adjust brightness and contrast of the images (which may include adjusting the speed of the robot to allow for more or less exposure on a particular area of pipe). Detector settings may be observed and controlled by component 1306, and a scan may be started or stopped by controls 1308. In the detector settings window a user may change various settings to optimize the system. For example, a user may change Pixel Binning settings to combine pixels together which will increase signal but decrease resolution. Lines per second settings allows a user to control the speed of acquisition. RCX beginning position and End position settings allows a user to choose a section of detector to use. Control 1310 may specify a length of the scan, which may cause the scan to end automatically once the specified length of traversal is completed.

Figure 16:
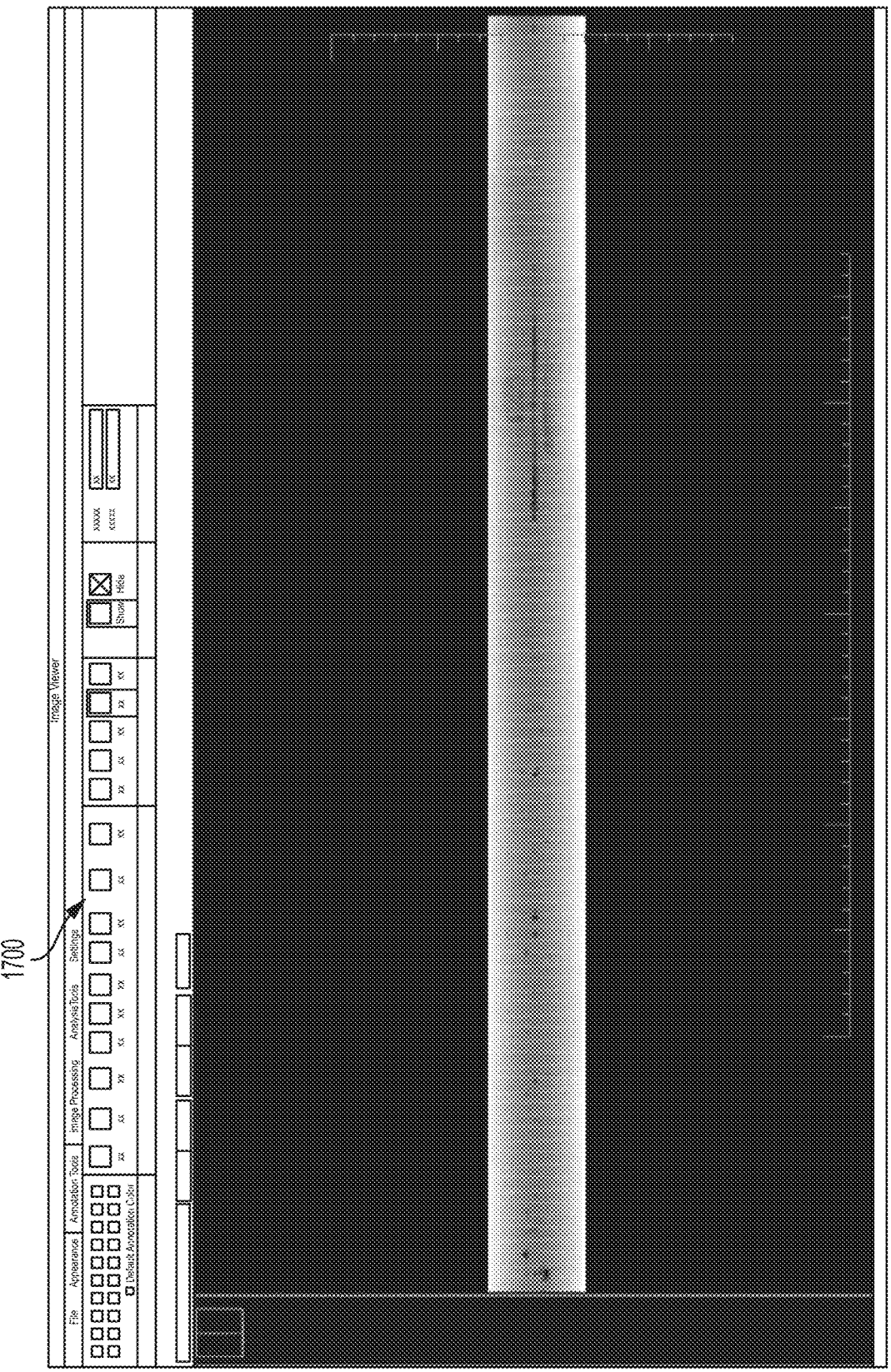
FIG. 16 is a screenshot illustrating user interface controls for further processing of a static image formed of image data acquired by a pipeline inspection robot according to some embodiments of the present disclosure.
Figure 17:
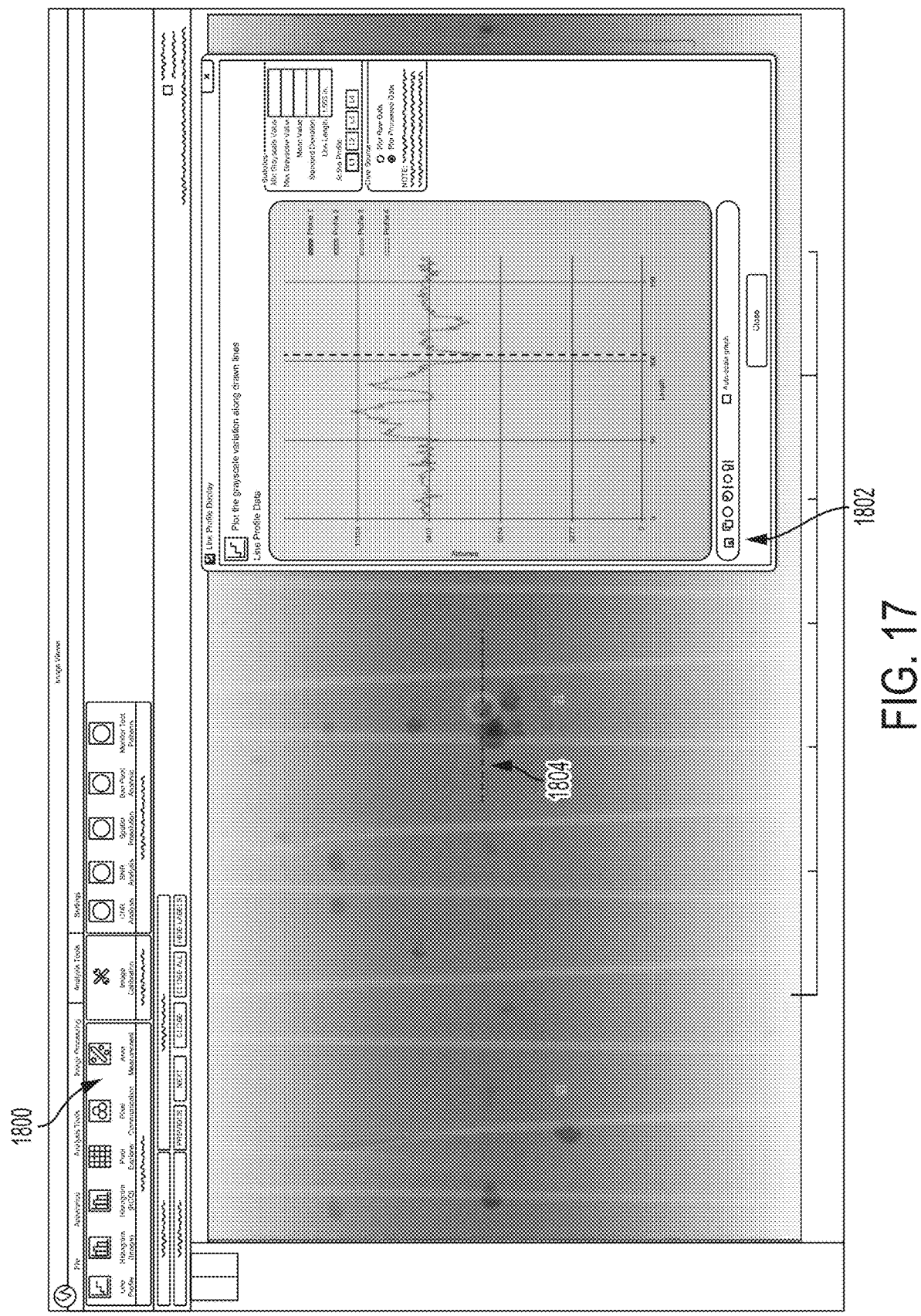
FIG. 17 is a screenshot illustrating user interface controls for analyzing a static image formed of image data acquired by a pipeline inspection robot according to some embodiments of the present disclosure.

Turning now to FIGS. 13-16 and referring generally thereto, the user interface may have various controls for displaying and processing a static image after the image data is acquired. In the illustrated embodiments, the static image is a 2D image that may have different tools and filters applied to change the way the image is viewed and/or oriented without changing the basic characteristics of the image. In some instances the image may be viewed in negative or positive modes. For example, under an appearance tab, various controls 1400 enable a user to window/level, invert, rotate, and adjust the image for presentation. A user may also perform a spatial calibration to measure indications in the image. Grayscale intensity readings in different regions may also allow a user to calculate density differences. Additionally, under an image processing tab, various controls 1500 enable a user to apply various filters to the image, such as an emboss filter, as shown in FIG. 16. Also, under an annotation tab, various controls 1700 enable a user to choose measurement units and annotate the image. As shown in FIG. 16 areas of higher density (the lighter areas) which are the lead numbers and image quality indicators and areas of lower density (the dark areas) indicating pitting in the pipe wall. The evenly spaced lighter lines are the overlapped seams in the spiral wrapped insulation jacketing. The images provided herein are of spiral wrapped insulated pipe and the dark areas displayed indicate pitting in the pipe wall, the darker the area the more wall loss there is. The perpendicular lighter bands at regular intervals are the overlapped seams in the insulation wrapping. The plot in FIG. 17 allows the user to measure grayscale levels along the line giving the user to determine the amount of wall loss.

Referring finally to FIG. 18, the user interface may also have various controls 1800 under an analysis tab that enable a user to analyze the image. For example, the user may generate a plot 1802 of greyscale levels along a profile line 1804. Alternatively or additionally, an area measurement tool may enable the user to measure an area of the image.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof The functional blocks and modules described herein (e.g., the functional blocks and modules in FIGS. 1 and 2) may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), hard disk, solid state disk, and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

Although embodiments of the present application and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps. Moreover, the scope of the present application is not intended to be limited to the particular embodiments of the process, machine, manufacture, composition of matter, means, methods and steps described in the specification.

The invention claimed is:

1. A method of operation for a pipeline inspection robot and generating inspection images, the method comprising:
    beginning a scan using control commands from one or more control processors of the inspection robot, said commands activating one or more imaging transmission sources and triggering directional movement of the robot to traverse the pipeline;
    acquiring image data by simultaneously capturing images from two or more azimuths as the robot traverses the pipeline, said two or more azimuths including a transverse azimuth and a perpendicular azimuth with respect to the robot and wherein the images are captured from two or more azimuths using one or more linear detectors;
    stopping the scan by deactivating the one or more transmission sources and stopping the directional movement of the robot; and
    converting the acquired image data into a single static image corresponding data acquired over a linear length of pipeline.

2. The method of claim 1, further comprising:
processing the static image by at least one of:
    adjusting at least one of brightness or contrast of the static image;
    inverting the static image;
    rotating the static image;
    filtering the static image;
    choosing measurement units for the static image; or
    annotating the static image.

3. The method of claim 1, further comprising:
analyzing the static image by at least one of:
    measuring grey scale levels across a line profile of the static image; or
    measuring an area of the static image.

4. The method of claim 1, wherein the static image is a Digital Imaging and Communication in Non-Destructive Evaluation (DICONDE) static image.

5. The method of claim 1, wherein the robot is configured to preprocess acquired image data prior to exporting the data to a remote storage location.

6. The method of claim 1, wherein the acquiring image data and the controlling speed is performed while displaying image capture results.

7. The method of claim 6, wherein the displaying image capture results is performed in a scrolling fashion.

8. The method of claim 1, wherein the one or more transmission sources correspond to one or more X-Ray tubes.

9. The method of claim 1, wherein the image data is acquired using one or more linear detectors.

10. An apparatus for operation of a pipeline inspection robot and generating inspection images, comprising:
    means for beginning a scan using control commands to control an inspection robot, said commands activating one or more imaging transmission sources and triggering directional movement of the robot to traverse the pipeline;
    means for acquiring image data by simultaneously capturing images from two or more azimuths as the robot traverses the pipeline, said two or more azimuths including a transverse azimuth and a perpendicular azimuth with respect to the inspection robot wherein the means for acquiring image data from two or more azimuths includes one or more linear detectors;
    means for stopping the scan by deactivating the one or more transmission sources and stopping the directional movement of the robot; and
    means for converting the acquired image data to a static image.

11. The apparatus of claim 10, further comprising:
means for processing the static image.

12. The apparatus of claim 10, further comprising:
means for analyzing the static image.

13. The apparatus of claim 10, further comprising:
means for preprocessing acquired image data prior to exporting the data to a remote storage location.

14. The apparatus of claim 10, further comprising:
means for displaying image capture results while acquiring the image data and controlling the speed.

15. The apparatus of claim 14, wherein the means for displaying image capture results includes means for displaying the image capture results in a scrolling fashion.

16. An apparatus comprising:
one or more computer processors; and
at least one memory coupled to the one or more computer processors, wherein the one or more computer processors is configured to:
activate one or more imaging transmission sources and directionally move a pipeline inspection robot to cause the robot to traverse the pipeline;
simultaneously capture images from two or more azimuths as the pipeline inspection robot traverses the pipeline, said two or more azimuths including a transverse azimuth and a perpendicular azimuth with respect to the pipeline inspection robot, wherein the images are captured from two or more azimuths using one or more linear detectors;
process the captured images for transmission to a remote processor; and
deactivate the one or more transmission sources and stop the directional movement of the robot.

17. The apparatus of claim 16, wherein the one or more computer processors is further configured to:
generate a video feed of an inspection area.

18. A non-transitory computer-readable storage medium having instructions recorded thereon that, when executed by one or more computer processor, cause the one or more computer processors to:
begin a scan by activating one or more transmission sources and triggering directional movement of a pipeline inspection robot;
acquire image data by simultaneously capturing images from two or more azimuths and controlling speed of the directional movement, wherein the images are captured from two or more azimuths using one or more linear detectors;
stop the scan by deactivating the one or more transmission sources and stopping the directional movement of the robot; and
convert the acquired image data to a static image.

19. The non-transitory computer-readable storage medium of claim 18, wherein the instructions further cause the one or more computer processors to:
process the static image by at least one of:
adjusting at least one of brightness or contrast of the static image;
inverting the static image;
rotating the static image;
filtering the static image;
choosing measurement units for the static image; or
annotating the static image.

20. The non-transitory computer-readable storage medium of claim 18, wherein the instructions further cause the one or more computer processors to:
analyze the static image by at least one of:
measuring grey scale levels across a line profile of the static image; or
measuring an area of the static image.

21. The non-transitory computer-readable storage medium of claim 18, wherein the instructions further cause the one or more computer processors to display a video feed of an inspection area.

22. The non-transitory computer-readable storage medium of claim 18, wherein the instructions further cause the one or more computer processors to display image capture results.

23. The non-transitory computer-readable storage medium of claim 22, wherein the instructions further cause the one or more computer processors to display the image capture results in a scrolling fashion.

\* \* \* \* \*